US012682073B2

(12) United States Patent
Watson et al.

(10) Patent No.:  US 12,682,073 B2
(45) Date of Patent:       Jul. 14, 2026

(54) SYSTEM AND METHOD FOR IDENTIFICATION OF SECURITY VULNERABILITIES USING ARTIFICIAL INTELLIGENCE-BASED ANALYSIS OF COMPUTING ENVIRONMENT LOGS

(71) Applicant: BANK OF AMERICA CORPORATION, Charlotte, NC (US)

(72) Inventors: Steven Anthony Watson, Jefferson, GA (US); Rashida Najiee Stephens, East Point, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 233 days.

(21) Appl. No.: 18/415,210

(22) Filed: Jan. 17, 2024

(65) Prior Publication Data

US 2025/0232038 A1     Jul. 17, 2025

(51) Int. Cl.
G06F 21/57          (2013.01)
G06F 21/00          (2013.01)
G06F 21/56          (2013.01)

(52) U.S. Cl.
CPC .......... G06F 21/577 (2013.01); G06F 21/568 (2013.01)

(58) Field of Classification Search
CPC ...... G06F 21/577; G06F 21/568; G06F 21/50; G06F 21/55; G06F 21/552; G06F 21/56; G06F 21/566; G06F 21/57
See application file for complete search history.

(56) References Cited

U.S. PATENT DOCUMENTS

| | | | |
|---|---|---|---|
| 9,386,034 B2 | 7/2016 | Cochenour |
| 9,998,443 B2 | 6/2018 | Cetlur |
| 10,387,899 B2 | 8/2019 | Fighel |
| 10,911,468 B2 | 2/2021 | Muddu |
| 11,388,169 B2 | 7/2022 | Badawy |
| 11,405,400 B2 | 8/2022 | Gazit |
| 11,487,903 B2 | 11/2022 | Schroeder |
| 11,616,801 B2 | 3/2023 | Sjouwerman |
| 11,625,648 B2 | 4/2023 | Polleri |
| 11,711,438 B2 | 7/2023 | Schroeder |
| 11,762,991 B2 | 9/2023 | Tyagi |
| 11,777,961 B2 | 10/2023 | Tyagi |
| 11,816,455 B2 | 11/2023 | Bodin |

(Continued)

*Primary Examiner* — Edward Zee
(74) *Attorney, Agent, or Firm* — Moore & Van Allen PLLC; Nicholas C. Russell

(57)          ABSTRACT

A system is provided for identification of security vulnerabilities using artificial intelligence-based analysis of computing environment logs. The system may analyze data logs associated with each of the endpoint devices associated with a software packet or service. Using an artificial intelligence engine, the system may identify the failure points of the software packet or service, which may result from outdated or nonfunctional code, incorrect parameter configuration, lack of computing resources, and/or the like. The system may further detect security issues associated with the software packet or service, such as a failure to mask or obfuscate sensitive data. Based the identified failure points, the system may generate recommended remediation processes to remediate the failure points. In this way, the system provides a way to remediate failure points in software using intelligent analysis of data logs.

15 Claims, 6 Drawing Sheets

(56)  References Cited

U.S. PATENT DOCUMENTS

| 11,822,670 | B2 | 11/2023 | Hecht | |
| 11,874,933 | B2 | 1/2024 | Tyagi | |
| 2017/0366562 | A1 | 12/2017 | Zhang | |
| 2018/0018459 | A1 | 1/2018 | Zhang | |
| 2020/0084242 | A1 | 3/2020 | Katragadda | |
| 2020/0137097 | A1 | 4/2020 | Zimmermann | |
| 2021/0157710 | A1* | 5/2021 | Alexander | G06F 11/3476 |
| 2021/0273957 | A1 | 9/2021 | Boyer | |
| 2024/0362097 | A1* | 10/2024 | Paulraj | G06F 11/004 |

* cited by examiner

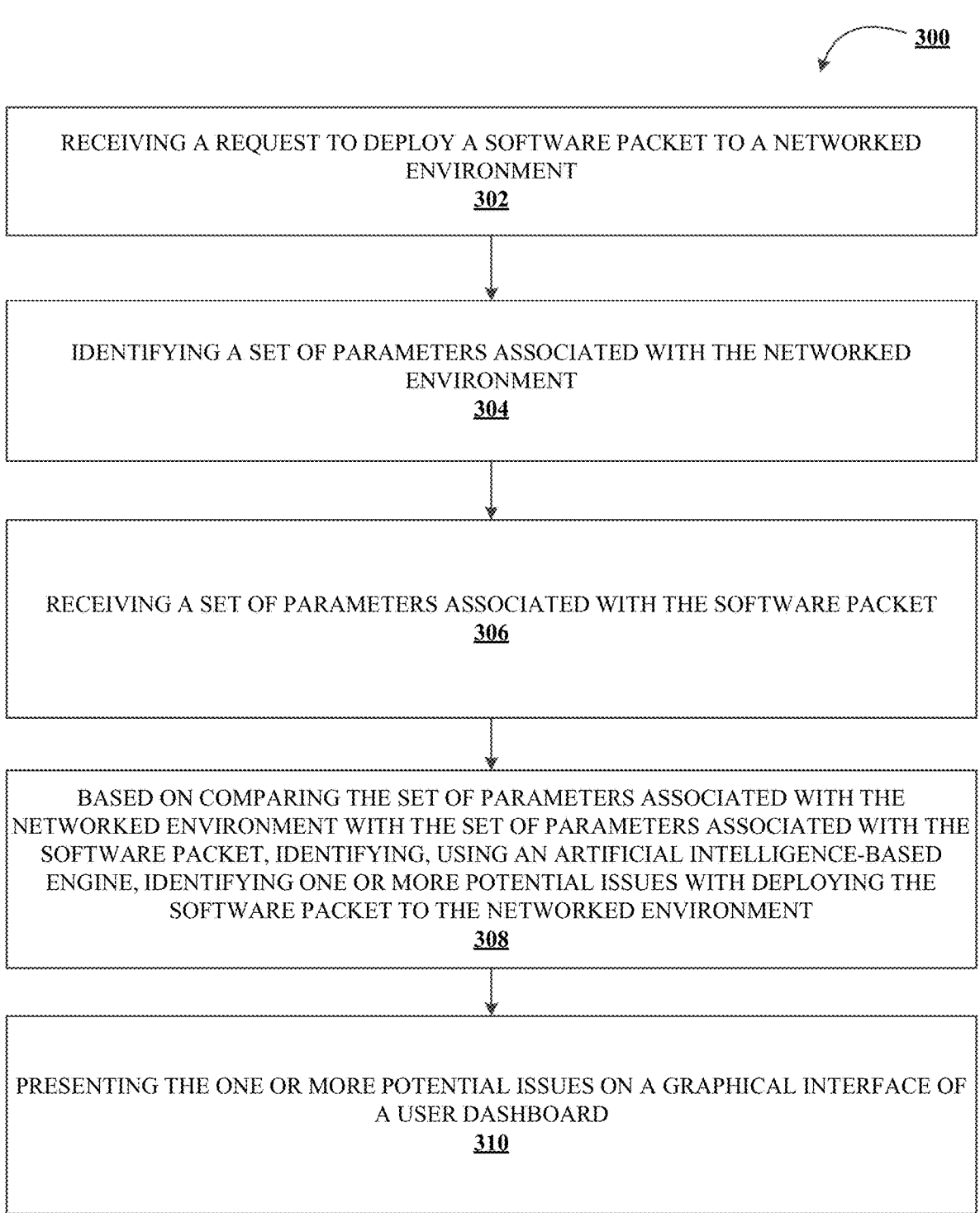

300

RECEIVING A REQUEST TO DEPLOY A SOFTWARE PACKET TO A NETWORKED
ENVIRONMENT
302

IDENTIFYING A SET OF PARAMETERS ASSOCIATED WITH THE NETWORKED
ENVIRONMENT
304

RECEIVING A SET OF PARAMETERS ASSOCIATED WITH THE SOFTWARE PACKET
306

BASED ON COMPARING THE SET OF PARAMETERS ASSOCIATED WITH THE
NETWORKED ENVIRONMENT WITH THE SET OF PARAMETERS ASSOCIATED WITH THE
SOFTWARE PACKET, IDENTIFYING, USING AN ARTIFICIAL INTELLIGENCE-BASED
ENGINE, IDENTIFYING ONE OR MORE POTENTIAL ISSUES WITH DEPLOYING THE
SOFTWARE PACKET TO THE NETWORKED ENVIRONMENT
308

PRESENTING THE ONE OR MORE POTENTIAL ISSUES ON A GRAPHICAL INTERFACE OF
A USER DASHBOARD
310

FIG. 3

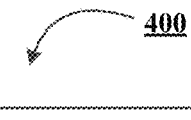
400

ANALYZING, USING AN ARTIFICIAL INTELLIGENCE-BASED ENGINE, ONE OR MORE DATA LOGS ASSOCIATED WITH A SOFTWARE SERVICE, WHEREIN THE ONE OR MORE DATA LOGS COMPRISES A DATA LOG ASSOCIATED WITH A TARGET COMPUTING DEVICE AND A DATA LOG ASSOCIATED WITH A THIRD-PARTY COMPUTING DEVICE
402

BASED ON ANALYZING THE ONE OR MORE DATA LOGS, IDENTIFYING A FAILURE POINT ASSOCIATED WITH THE SOFTWARE SERVICE
404

BASED ON IDENTIFYING THE FAILURE POINT, GENERATING, USING THE ARTIFICIAL INTELLIGENCE-BASED ENGINE, A RECOMMENDED REMEDIATION PROCESS FOR REMEDIATING THE FAILURE POINT
406

TRANSMITTING THE RECOMMENDED REMEDIATION PROCESS TO THE THIRD-PARTY COMPUTING DEVICE
408

FIG. 4

SYSTEM AND METHOD FOR IDENTIFICATION OF SECURITY VULNERABILITIES USING ARTIFICIAL INTELLIGENCE-BASED ANALYSIS OF COMPUTING ENVIRONMENT LOGS

TECHNOLOGICAL FIELD

Example embodiments of the present disclosure relate to a system for identification of security vulnerabilities using artificial intelligence-based analysis of computing environment logs.

BACKGROUND

There is a need for a secure, efficient way to perform intelligent analysis of failure points within a software packet or service.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for artificial intelligence-based detection and remediation of issues during software onboarding and deployment. In particular, the system may comprise an artificial intelligence ("AI") engine that may be configured to identify gaps and/or potential issues in an onboarding and/or integration process for a computing software solution. In this regard, the AI engine may identify the variables and/or parameters of the target computing environment (e.g., an entity's production environment) and the variable and/or parameters of the incoming software. Based on the variables and/or parameters, the AI engine may determine the potential issues that may arise during onboarding, how such issues may affect the target computing environment, and/or the remediation processes that may be required to resolve the issues. In this way, the system may provide an efficient way to identify and remediate potential issues during the software onboarding process.

A system is further provided for identification of security vulnerabilities using artificial intelligence-based analysis of computing environment logs. The system may analyze data logs associated with each of the endpoint devices associated with a software packet or service. Using an artificial intelligence engine, the system may identify the failure points of the software packet or service, which may result from outdated or nonfunctional code, incorrect parameter configuration, lack of computing resources, and/or the like. The system may further detect security issues associated with the software packet or service, such as a failure to mask or obfuscate sensitive data. Based the identified failure points, the system may generate recommended remediation processes to remediate the failure points. In this way, the system provides a way to remediate failure points in software using intelligent analysis of data logs.

Accordingly, embodiments of the present disclosure provide a system for artificial intelligence-based detection and remediation of issues during software onboarding and deployment, the system comprising a processing device; a non-transitory storage device containing instructions when executed by the processing device, causes the processing device to perform the steps of receiving a request to deploy a software packet to a networked environment; identifying a set of parameters associated with the networked environment; receiving a set of parameters associated with the software packet; based on comparing the set of parameters associated with the networked environment with the set of parameters associated with the software packet, identifying, using an artificial intelligence-based engine, identifying one or more potential issues with deploying the software packet to the networked environment; and presenting the one or more potential issues on a graphical interface of a user dashboard.

In some embodiments, identifying the one or more potential issues comprises deploying the software packet to a virtualized environment; detecting a failure associated with deploying the software packet to the virtualized environment; and based on detecting the failure, using the artificial intelligence-based engine to intelligently identify one or more causes of the failure.

In some embodiments, identifying the one or more potential issues comprises identifying a predicted effect of the one or more potential issues on the networked environment and on the software packet.

In some embodiments, the instructions, when executed by the processing device, further cause the processing device to perform the step of executing one or more remediation processes to remediate the one or more potential issues.

In some embodiments, the one or more remediation processes comprises automatically generating, using the artificial intelligence-based engine, a proposed code change to the software packet; and transmitting the proposed code change to a third party computing device associated with the software packet.

In some embodiments, the one or more remediation processes comprises automatically deploying an update to the networked environment, wherein the update comprises at least one of an update to at least a portion of the one or more parameters associated with the networked environment or an update to at least a portion of the one or more parameters associated with the software packet.

In some embodiments, the one or more potential issues comprises at least one of a performance issue, a compatibility issue, or a dependency issue.

Embodiments of the present disclosure also provide a computer program product for artificial intelligence-based detection and remediation of issues during software onboarding and deployment, the computer program product comprising a non-transitory computer-readable medium comprising code causing an apparatus to perform the steps of receiving a request to deploy a software packet to a networked environment; identifying a set of parameters associated with the networked environment; receiving a set of parameters associated with the software packet; based on comparing the set of parameters associated with the networked environment with the set of parameters associated with the software packet, identifying, using an artificial intelligence-based engine, identifying one or more potential issues with deploying the software packet to the networked environment; and presenting the one or more potential issues on a graphical interface of a user dashboard.

In some embodiments, identifying the one or more potential issues comprises deploying the software packet to a virtualized environment; detecting a failure associated with deploying the software packet to the virtualized environment; and based on detecting the failure, using the artificial intelligence-based engine to intelligently identify one or more causes of the failure.

In some embodiments, identifying the one or more potential issues comprises identifying a predicted effect of the one or more potential issues on the networked environment and on the software packet.

In some embodiments, the code further causes the apparatus to perform the step of executing one or more remediation processes to remediate the one or more potential issues.

In some embodiments, the one or more remediation processes comprises automatically generating, using the artificial intelligence-based engine, a proposed code change to the software packet; and transmitting the proposed code change to a third party computing device associated with the software packet.

In some embodiments, the one or more remediation processes comprises automatically deploying an update to the networked environment, wherein the update comprises at least one of an update to at least a portion of the one or more parameters associated with the networked environment or an update to at least a portion of the one or more parameters associated with the software packet.

Embodiments of the present disclosure also provide a computer-implemented method for artificial intelligence-based detection and remediation of issues during software onboarding and deployment, the computer-implemented method comprising receiving a request to deploy a software packet to a networked environment; identifying a set of parameters associated with the networked environment; receiving a set of parameters associated with the software packet; based on comparing the set of parameters associated with the networked environment with the set of parameters associated with the software packet, identifying, using an artificial intelligence-based engine, identifying one or more potential issues with deploying the software packet to the networked environment; and presenting the one or more potential issues on a graphical interface of a user dashboard.

In some embodiments, identifying the one or more potential issues comprises deploying the software packet to a virtualized environment; detecting a failure associated with deploying the software packet to the virtualized environment; and based on detecting the failure, using the artificial intelligence-based engine to intelligently identify one or more causes of the failure.

In some embodiments, identifying the one or more potential issues comprises identifying a predicted effect of the one or more potential issues on the networked environment and on the software packet.

In some embodiments, the method further comprises executing one or more remediation processes to remediate the one or more potential issues.

In some embodiments, the one or more remediation processes comprises automatically generating, using the artificial intelligence-based engine, a proposed code change to the software packet; and transmitting the proposed code change to a third party computing device associated with the software packet.

In some embodiments, the one or more remediation processes comprises automatically deploying an update to the networked environment, wherein the update comprises at least one of an update to at least a portion of the one or more parameters associated with the networked environment or an update to at least a portion of the one or more parameters associated with the software packet.

In some embodiments, the one or more potential issues comprises at least one of a performance issue, a compatibility issue, or a dependency issue.

Embodiments of the present disclosure also provide a system for identification of security vulnerabilities using artificial intelligence-based analysis of computing environment logs, the system comprising a processing device; a non-transitory storage device containing instructions when executed by the processing device, causes the processing device to perform the steps of analyzing, using an artificial intelligence-based engine, one or more data logs associated with a software service, wherein the one or more data logs comprises a data log associated with a target computing device and a data log associated with a third-party computing device; based on analyzing the one or more data logs, identifying a failure point associated with the software service; based on identifying the failure point, generating, using the artificial intelligence-based engine, a recommended remediation process for remediating the failure point; and transmitting the recommended remediation process to the third-party computing device.

In some embodiments, identifying the failure point associated with the software service comprises identifying a security vulnerability associated with the software service, wherein the recommended remediation process comprises a code change to the software service to address the security vulnerability.

In some embodiments, the security vulnerability is a failure to mask private data, wherein the code change to the software service comprises a code change to obfuscate the private data.

In some embodiments, identifying the failure point associated with the software service comprises identifying a parameter mismatch between the software service and the target computing device, wherein the recommended remediation process comprises updating a parameter setting of the target computing device or the software service.

In some embodiments, the instructions, when executed by the processing device, further cause the processing device to perform the step of executing the recommended remediation process.

In some embodiments, executing the recommended remediation process comprising updating one or more parameters associated with the target computing device or the software service.

In some embodiments, the recommended remediation process comprises a code change to the software service to address the failure point.

Embodiments of the present disclosure also provide a computer program product for identification of security vulnerabilities using artificial intelligence-based analysis of computing environment logs, the computer program product comprising a non-transitory computer-readable medium comprising code causing an apparatus to perform the steps of analyzing, using an artificial intelligence-based engine, one or more data logs associated with a software service, wherein the one or more data logs comprises a data log associated with a target computing device and a data log associated with a third-party computing device; based on analyzing the one or more data logs, identifying a failure point associated with the software service; based on identifying the failure point, generating, using the artificial intelligence-based engine, a recommended remediation process for remediating the failure point; and transmitting the recommended remediation process to the third-party computing device.

In some embodiments, identifying the failure point associated with the software service comprises identifying a security vulnerability associated with the software service, wherein the recommended remediation process comprises a code change to the software service to address the security vulnerability.

In some embodiments, the security vulnerability is a failure to mask private data, wherein the code change to the software service comprises a code change to obfuscate the private data.

In some embodiments, identifying the failure point associated with the software service comprises identifying a parameter mismatch between the software service and the target computing device, wherein the recommended remediation process comprises updating a parameter setting of the target computing device or the software service.

In some embodiments, the code further causes the apparatus to perform the step of executing the recommended remediation process.

In some embodiments, executing the recommended remediation process comprising updating one or more parameters associated with the target computing device or the software service.

In some embodiments, the recommended remediation process comprises a code change to the software service to address the failure point.

Embodiments of the present disclosure also provide a computer-implemented method for identification of security vulnerabilities using artificial intelligence-based analysis of computing environment logs, the computer-implemented method comprising analyzing, using an artificial intelligence-based engine, one or more data logs associated with a software service, wherein the one or more data logs comprises a data log associated with a target computing device and a data log associated with a third-party computing device; based on analyzing the one or more data logs, identifying a failure point associated with the software service; based on identifying the failure point, generating, using the artificial intelligence-based engine, a recommended remediation process for remediating the failure point; and transmitting the recommended remediation process to the third-party computing device.

In some embodiments, identifying the failure point associated with the software service comprises identifying a security vulnerability associated with the software service, wherein the recommended remediation process comprises a code change to the software service to address the security vulnerability.

In some embodiments, identifying the failure point associated with the software service comprises identifying a parameter mismatch between the software service and the target computing device, wherein the recommended remediation process comprises updating a parameter setting of the target computing device or the software service.

In some embodiments, the method further comprises executing the recommended remediation process.

In some embodiments, executing the recommended remediation process comprising updating one or more parameters associated with the target computing device or the software service.

In some embodiments, the recommended remediation process comprises a code change to the software service to address the failure point.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
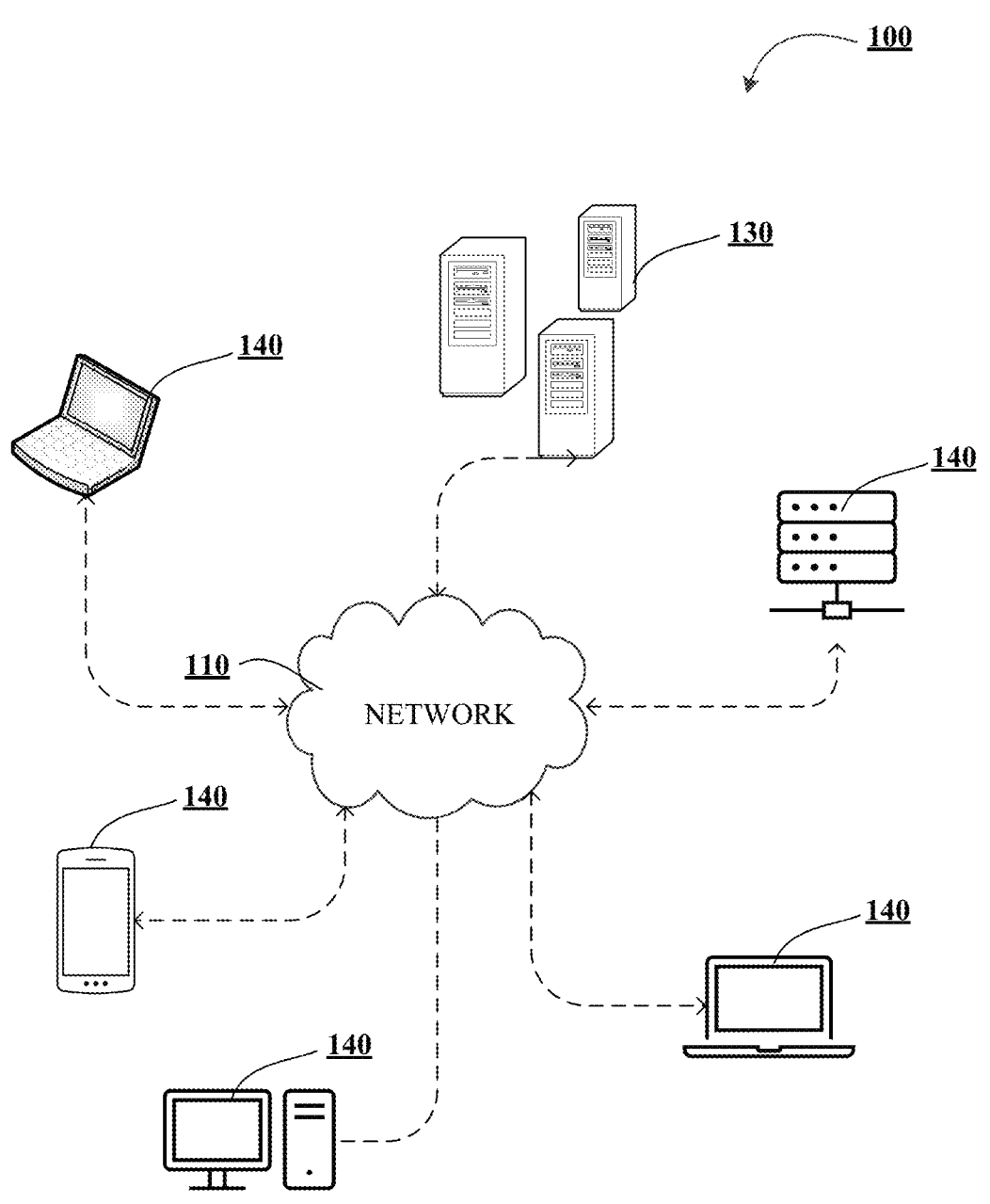
Figure 1B:
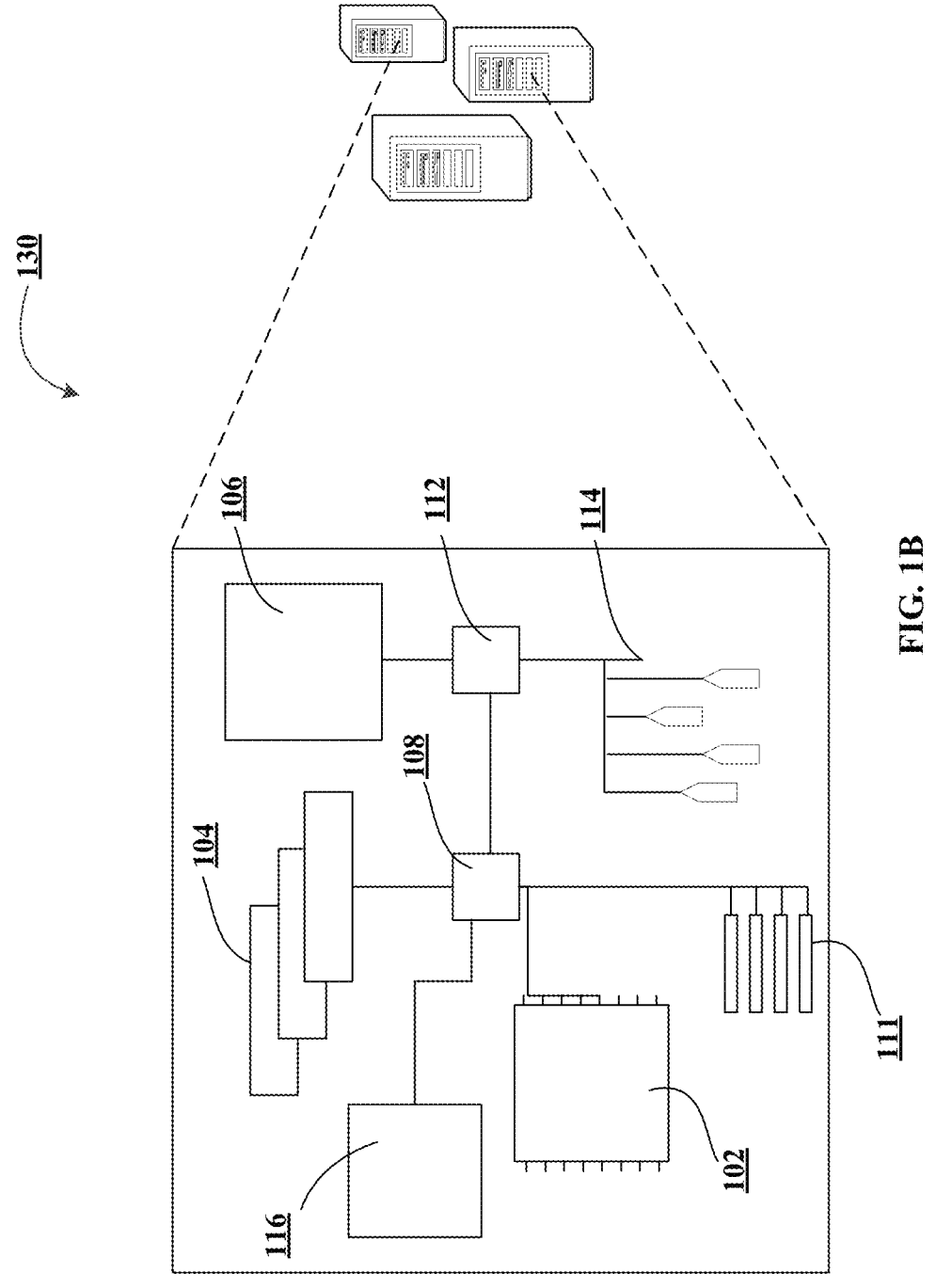
Figure 1C:
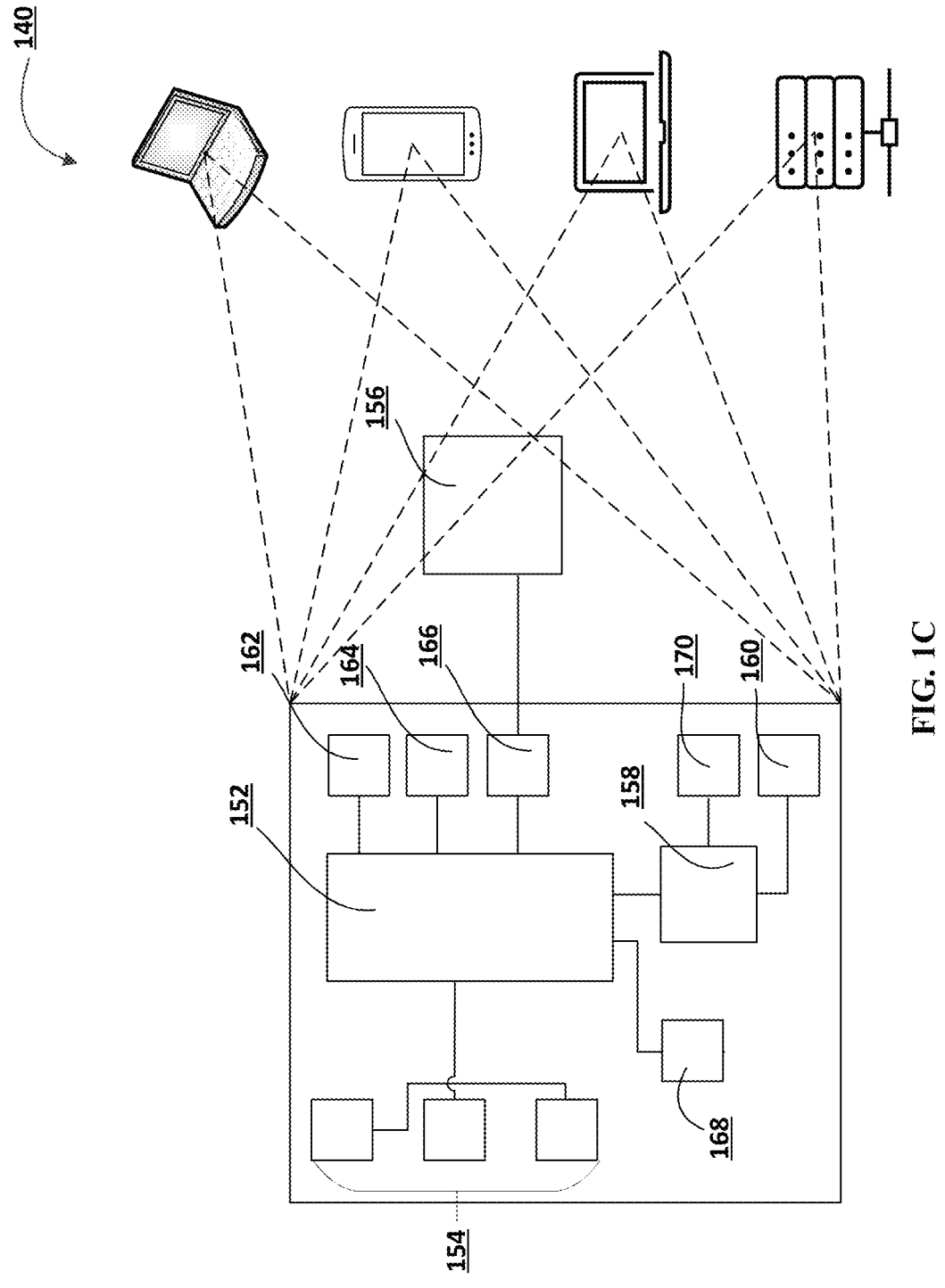
Figure 2:
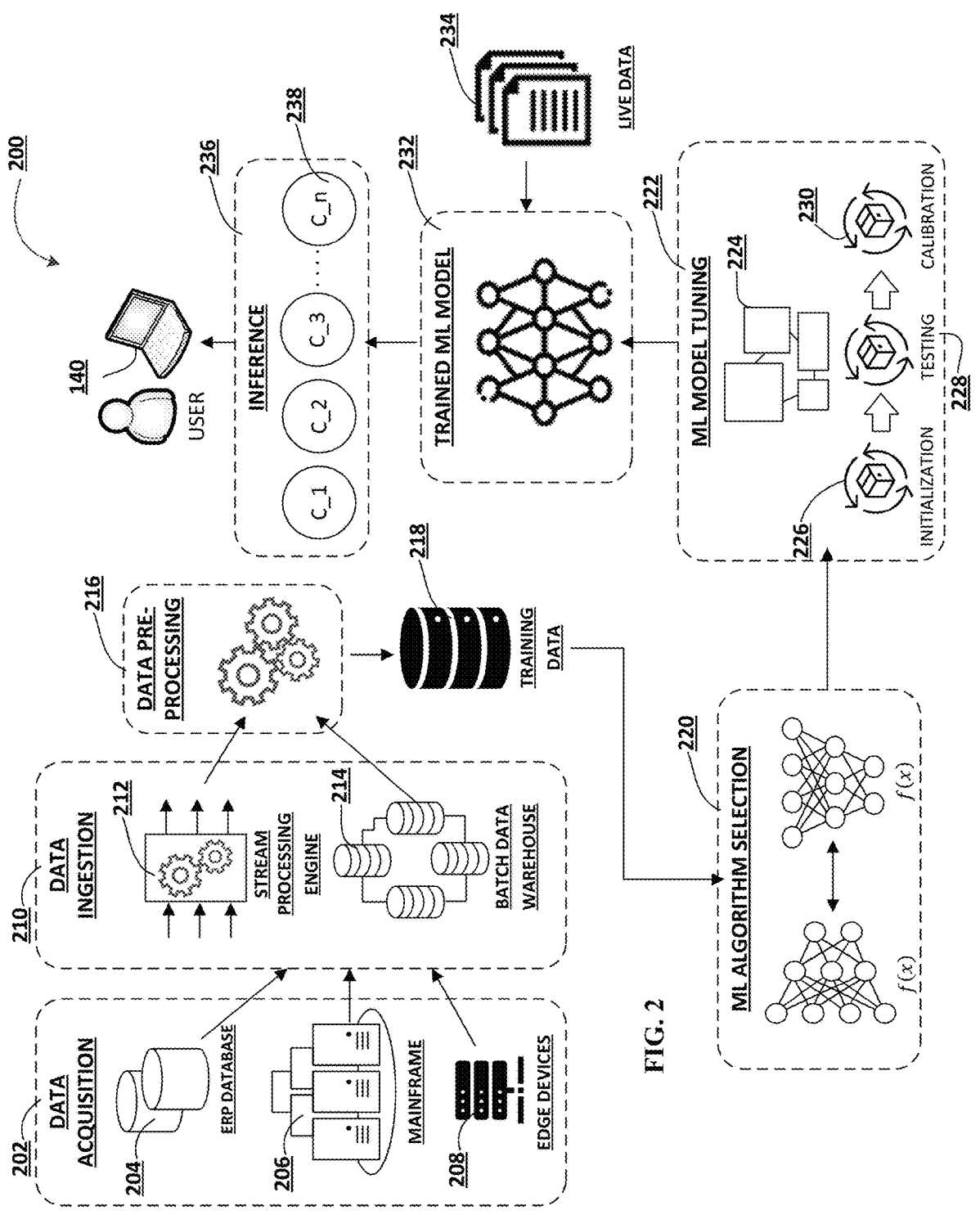

FIGS. 1A, 1B, and 1C illustrates technical components of an exemplary distributed computing system for artificial intelligence-based detection and remediation of issues during software onboarding and deployment, in accordance with an embodiment of the disclosure;

FIG. 2 illustrates an exemplary machine learning subsystem architecture, in accordance with an embodiment of the invention;

FIG. 3 illustrates a method for artificial intelligence-based detection and remediation of issues during software onboarding and deployment, in accordance with an embodiment of the disclosure; and FIG. 4 illustrates a method for identification of security vulnerabilities using artificial intelligence-based analysis of computing environment logs.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity.

In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like.

An entity's networked computing environment may include various deployments and/or integrations with third party software solutions. For instance, computing devices within a production environment may have third party applications installed thereon, and/or integrate third party software (e.g., software-as-a-service or "SaaS") into their production workflows. That said, a variety of potential technical issues may arise during the installation, deployment, and/or integration of the third party software solutions (which may take the form of a "software packet") into the entity's networked environment. For instance, an application may experience performance issues (e.g., responsiveness or input/output latency issues, application hanging or freezing, network delays, and/or the like), stability issues (e.g., application crashes, unexpected application outputs, and/or the like), compatibility issues (e.g., outdated libraries or hardware/software dependencies, parameter mismatches, and/or the like), security issues (e.g., failure to mask or obscure sensitive or private data, outdated security certificates or encryption methods, and/or the like), and/or other types of issues. On the other hand, identification of such issues may be a difficult and time-intensive process, particularly when there are latent issues that do not become apparent until the software solution has already been integrated into the production environment. Accordingly, there is a need for a more efficient way to identify potential issues associated with a software solution before the software is deployed to the entity's networked environments.

To address the above concerns among others, the system described herein provides a way to perform artificial intelligence ("AI") based detection and remediation of issues during software onboarding and deployment. In this regard, the system may an artificial intelligence-based engine that may be trained using information regarding software deployments previously processed by the entity's systems (or "historical software deployment data," or "training data"). The historical software deployment data may include, for instance, information or parameters regarding the target computing environment into which the software was deployed (e.g., environmental variables, hardware and/or software configurations, installed applications and/or dependencies, installed libraries, operating system information, application and/or system parameters, performance data over time, computing resource information such as memory space or processing overhead, system update information, and/or the like) as well as information or parameters regarding the software itself (e.g., system and/or dependency requirements, version information, supplier and/or third-party documentation, third-party intelligence feeds, partial or full copies of the source code, and/or the like).

The historical software deployment data may further comprise information about historical technical issues that may have arisen during deployment of software packages in the past. For instance, the training data may indicate that a particular production environment (which may be running a particular operating system version) experienced performance issues (e.g., latency or responsiveness issues) with an application that was deployed to various computing devices within the production environment. Accordingly, in such embodiments along with others, the training data may further indicate one or more remediation processes that were used to remediate the technical issues. Continuing the example, the training data may indicate that the performance issues within the production environment were resolved by deploying an operating system update to the affected computing devices within the production environment. In other cases, the remediation processes may include steps such as updating applications, updating libraries and/or dependencies, installation or removal of hardware and/or software components, installing firmware updates, changing application or system parameters, changes to the source code of the software to be deployed, and/or the like.

By training the AI-based engine using the training data described herein, the AI-based engine may be able to proactively identify potential issues that may arise from deployment of a proposed software package upon receiving, as inputs, the current information regarding the target networked environment (e.g., the production environment) and the current information regarding the software package to be deployed. Accordingly, the AI-based engine may read a set of parameters associated with the target networked environment as well a set of parameters associated with the software package. Based on analyzing the parameters associated with the target environment and the parameters associated with the software package, the system may determine what potential issues may arise during the deployment of the software package to the target environment. In some environments, analyzing the parameters may include initializing a virtualized environment that has been instantiated using the parameters associated with the target environment, and executing a virtual deployment of the software package to the virtualized environment.

Subsequently, the system may detect one or more failures that occur during the deployment of the software package to the virtualized environment. For example, the failure may include the deployed application becoming unresponsive (e.g., freezing or hanging) during runtime within the virtualized environment. Based on the issues or failures that are detected during the virtual deployment, the AI-based engine may classify and/or categorize the detected issues in accordance with its trained machine learning models, intelligently identify one or more causes of the failure, as well as identify potential remediation steps to remediate the detected issues. For instance, the system may analyze runtime logs, system logs, and/or environmental logs generated in the virtualized environment and use the AI-based engine to intelligently identify the root cause of the freezing or hanging. The system may further identify one or more predicted effects of deploying the software package based on the failures detected in the virtualized environment. For instance, the system may determine that, based on the application freezing or hanging in the virtualized environment (which has been initialized using the same parameters as those of the production environment), the deployment of the software package to the production environment will also cause freezing or hanging in the production environment. In this way, the system may intelligently predict the types of issues that may occur during deployment of software packages.

In some embodiments, the AI-based engine may further comprise a code generation module that may be trained to generate changes (e.g., additions, substitutions, deletions, reformatting, and/or the like) to the source code associated with the software package in order to remediate the potential issues. For instance, the AI-based engine may detect that a software bug may cause certain functions of a deployed application to stop working. Subsequently, the code generation module may be used by the AI-based engine to generate a change to the source code of the software package to fix the detected software bug. The changes to the source code may be presented, along with a description of the proposed source code change, to a user dashboard (e.g., a graphical interface of the supplier of the software, such as a software developer). In some embodiments, the description of the proposed source code change may be generated using a natural language generation ("NLG") module of the AI-based engine, which may generate the description based on the nature of the detected software bug and the code changes to address the software bug. Subsequently, the software supplier or vendor may implement the proposed source code change on the server-side, thereby preventing the issue from affecting the entity's production environment.

In some embodiments, the AI-based engine may further comprise a process execution module that may automatically execute one or more remediation processes to resolve potential issues before such issues arise. For instance, the process execution module may, in response to the AI-based engine detecting a parameter mis-setting or mismatch between the parameters of the target environment and the parameters of the software package (e.g., the application to be deployed specifies an invalid parameter that is incompatible with the target environment), change the parameters of the target environment and/or the software package to automatically resolve the issues. The process execution module may further be configured to perform other remediation processes, such as automatically deploying operating system and/or software updates, freeing computing resources (e.g., deleting temporary files to recover storage space for the software deployment), The system as described herein provides a number of technological benefits over conventional methods for detecting potential issues. For instance, by using an AI-based engine, the system may proactively and preemptively identify issues that may not otherwise be detected during the manual onboarding and/or software certification process. Furthermore, by using the process execution module, the system may automatically implement remediation processes on the network environment and/or the software package to effectively prevent potential issues from interfering with the entity's processes and workflows.

In some embodiments, the system may further perform AI-based analysis of data logs of the target environment and/or computing devices as well as those of third-party devices and/or software packages. In this regard, the data logs may contain various types of information about the computing environment and/or the software package deployed within the computing environment, which may include information such as runtime warnings and/or errors, system performance information at runtime and over a period of time, response codes, process failure information, application failure information, and/or the like. In some embodiments, the information may further include processes attempted and/or completed by the software package, which may include information regarding which computing devices as well as hardware/software components were involved in the processes, a timestamp for execution of such processes, the end result or outcome of the processes (e.g., success or failure of the process), and/or the like.

Based on analyzing the data logs associated with the application and/or computing environment, the AI-based engine may identify one or more root causes of failures (or "failure points") associated with the software package or software service. Examples of such failure points may include, for instance, dependency failures, lack of computing resources (e.g., lack of memory), parameter mismatches or misconfiguration, outdated or deprecated code, architecture or hardware failures (e.g., Internet outages, power outages, server unavailability, and/or the like), and/or the like. In some embodiments, the failure points may further include security vulnerabilities associated with the software package, such as outdated encryption standards, failure to mask, obfuscate, and/or encrypt sensitive data, malware vulnerabilities, and/or the like.

Upon identifying the potential failure points, the system may generate a recommended remediation process for remediating the failure point. The recommended remediation process may depend on the nature of the failure point. For instance, if the failure point is a hardware or architecture related failure, the recommended remediation process may include a proposed change to the hardware or architecture (e.g., adding, removing, and/or swapping hardware components such as a failing disk drive). If the failure point is a software or dependency related issue, the recommended remediation process may include an update or installation of the required software and/or dependencies. Furthermore, if the failure point is related to faulty or outdated code within the software package, the recommended remediation process may include a source code update for the software package. As described above, in some embodiments, the system may automatically execute certain remediation processes to address the failure points. For instance, if the failure point relates to outdated operating system files, the system may automatically deploy an update to the operating system of affected computing devices within the target network environment.

Once the recommended remediation process is generated, the system may transmit the recommended remediation process to a third-party computing device. For instance, if the recommended remediation process is a change to the source code of the software package, the third-party computing device may be a computing device of the software supplier that provided the software package. Accordingly, by using the information specified by the recommended remediation process (e.g., changes to the source code), the software supplier may implement the recommended changes to resolve the failure points. Though the word "third-party" is used with respect to "third-party computing device," it should be understood that "third-party computing device" may further include computing devices associated with the entity's network environment. For instance, in some cases, such as when the recommended remediation process is a change to the architecture of the entity, the third-party computing device may be a computing device of a systems administrator of the entity who may be authorized to effect such changes in the architecture of the network environment.

In an exemplary embodiment, the software package to be deployed to the production environment may be an application or process used in processing end-to-end transactions. Accordingly, the computing devices involved in processing the transaction (e.g., the entity's endpoint device, the software supplier's endpoint device, along with any other intermediary endpoint devices) may each keep a data log of each transaction processed, where the data log may indicate the various steps taken within the transaction along with any transaction-related failures. By analyzing the data logs of each of the endpoint devices within the chain, the system may identify the failure points of the transaction (e.g., at which node the transaction failed, at what step the transaction failed, the operating parameters and/or conditions of each endpoint device, and/or the like), along with the causes of the failure points (e.g., lack of computing resources, incorrect parameter settings, outdated dependencies, deprecated application functions, and/or the like).

In another exemplary embodiment, the system may use the AI-based engine to detect a security vulnerability within the software package or service. For instance, the system may determine that certain data fields that are processed within an application are stored in cleartext or plaintext, where such data fields may be used to process personally identifiable information ("PII") such as customer data. In such a scenario, the system may detect the security vulnerability and suggest a code change to the software package to remedy the security vulnerability. For instance, the code change may include masking or obfuscating the information processed in such data fields to better protect any sensitive information from leaking to unauthorized parties.

Turning now to the figures, FIGS. 1A-1C illustrate technical components of an exemplary distributed computing environment 100 for the system for artificial intelligence-based detection and remediation of issues during software onboarding and deployment and for identification of security vulnerabilities using artificial intelligence-based analysis of computing environment logs. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102 (which may also be referred to herein as a "processing device"), memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130)

and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a method 300 for artificial intelligence-based detection and remediation of issues during software onboarding and deployment. As shown in block 302, the method includes receiving a request to deploy a software packet to a networked environment. In particular, the request to deploy the software packet may be a request to integrate a third party's (e.g., a software vendor's) software solution into an entity's computing environment (e.g., a production environment). As such, the request may be received from an endpoint device within the entity's computing environment, such as a computing device of a systems administrator of the entity. In some embodiments, deploying the software packet may include installing a third party application on one or more endpoint devices within the target computing environment. In other embodiments, deploying the software packet may include integrating one or more functions of a remote application (e.g., an application running on an SaaS model) into a workflow of the one or more endpoint devices within the target computing environment.

Next, as shown in block 304, the method includes identifying a set of parameters associated with the networked environment. The parameters detected by the system may include any number of parameters that may affect the compatibility, stability, or functionality of the software package once it is deployed to the networked environment. Accordingly, the parameters may include, for instance, operating system information, software/hardware component information, installed applications, libraries, and/or dependencies, operating performance information (e.g., available memory space, processing overhead, network latency, power consumption, thermal readings, and/or the like), and/or the like.

Next, as shown in block 306, the method includes receiving a set of parameters associated with the software packet. The set of parameters associated with the software packet may include, for instance, hardware and/or software requirements for deployment, dependency requirements, operating system requirements, known interactions or bugs with hardware and/or software components, bundled libraries, and/or the like.

Next, as shown in block 308, the method includes, based on comparing the set of parameters associated with the networked environment with the set of parameters associated with the software packet, identifying, using an artificial intelligence-based engine, identifying one or more potential issues with deploying the software packet to the networked environment. The system's AI-based engine may have been trained using historical data regarding past deployments of third-party software within the networked environment. Accordingly, the system may be able to intelligently predict the occurrence of various issues that may arise upon deployment of the software. For instance, examples of such issues may include compatibility issues (e.g., incompatible software that may cause application crashes or failures), performance issues (e.g., application latency or unresponsiveness, application downtime, and/or the like), security issues (e.g., failure to mask sensitive data, use of outdated encryption standards, application malware vulnerability, and/or the like), and/or the like.

Next, as shown in block 310, the method includes presenting the one or more potential issues on a graphical interface of a user dashboard. The user dashboard may be an interface presented on a display device of a computing device of a user, where the user may be an individual with authority to implement one or more remediation processes with respect to the software packet. For instance, the user may be a developer associated with the third party software supplier. In other embodiments, the user may be a systems administrator of the entity who has been authorized to make changes to the networked infrastructure or system architecture. In this regard, the issues may be presented on the graphical interface of the user dashboard, where the issues may be presented as a description of the detected potential issues along with a description of the recommended remediation processes to address such issues. In scenarios in which the recommended remediation process is a code change, the specific source code changes may be presented on the graphical interface for review by the user. Accordingly, the graphical interface may further include user input elements (e.g., clickable or interactable buttons, radio selection buttons, drop-down menus, and/or the like) through which the user may accept or reject the recommended remediation process. If the user accepts the recommended remediation process, the system may automatically execute the recommended remediation process (e.g., automatically implement the source code changes as presented on the graphical interface).

FIG. 4 illustrates a method 400 for identification of security vulnerabilities using artificial intelligence-based analysis of computing environment logs. As shown in block 402, the method includes analyzing, using an artificial intelligence-based engine, one or more data logs associated with a software service, wherein the one or more data logs comprises a data log associated with a target computing device and a data log associated with a third-party computing device. The data logs may contain various types of information regarding the operation and functionality of the computing devices involved in the workflow of the specified software service or packet, as described elsewhere herein. For instance, the data logs may include information regarding runtime parameters, runtime exceptions, unexpected exceptions (e.g., errors occurring during operation of the application), application uptime, performance data over time, and/or the like.

Next, as shown in block 404, the method includes based on analyzing the one or more data logs, identifying a failure point associated with the software service. The failure points associated with the software service may include information regarding application freezes or hangs, application crashes, application malfunctions, and/or the like. In this regard, in some embodiments, identifying the failure point associated with the software service may include detecting a root cause of the failure point from analyzing the one or more data logs. For instance, the system may determine that the root causes of the failure point resulted from a lack of computing resources (e.g., not enough operating memory). In other scenarios, the system may determine that the root cause is a misconfiguration or mismatch of parameters across computing devices involved in the workflow of the application.

Next, as shown in block 406, the method includes based on identifying the failure point, generating, using the artificial intelligence-based engine, a recommended remediation process for remediating the failure point. The recommended remediation process may be determined based on determining the root cause of the failure point as described elsewhere herein. For instance, if the root cause is a lack of computing resources, the recommended remediation process may be to increase the availability of computing resources (e.g., freeing up memory, moving running processes to the background, reducing networking overhead, and/or the like). In cases in which the root cause is a misconfiguration of parameters, the recommended remediation process may include setting valid parameters for the one or more endpoint devices that may have been misconfigured.

Next, as shown in block 408, the method includes transmitting the recommended remediation process to the third-party computing device. The third-party computing device may be, for instance, a computing device associated with a third party provider of the software service. Accordingly, the recommended remediation process may include executable code that may be implemented server-side by the third party provider in order to remediate the failure points of the software service. For instance, the recommended remediation process may include a source code change that may be implemented into the code of the software service. In some embodiments, the system may automatically implement the recommended remediation process, such as scenarios in which the failure point is within the entity's network. For example, if the failure point resulted from a lack of computing resources, the system may automatically free up the relevant computing resources to ensure continued operation of the software service.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for identification of security vulnerabilities using artificial intelligence-based analysis of computing environment logs, the system comprising:

a processing device;

a non-transitory storage device containing instructions when executed by the processing device, causes the processing device to perform the steps of:

analyzing, using an artificial intelligence-based engine, one or more data logs associated with a software service, wherein the one or more data logs comprises a data log associated with a target computing device and a data log associated with a third-party computing device;

based on analyzing the one or more data logs, identifying a failure point associated with the software service, wherein identifying the failure point associated with the software service comprises identifying a security vulnerability associated with the software service, wherein the recommended remediation process comprises a code change to the software service to address the security vulnerability, wherein the security vulnerability is a failure to mask private data, wherein the code change to the software service comprises a code change to obfuscate the private data;

based on identifying the failure point, generating, using the artificial intelligence-based engine, a recommended remediation process for remediating the failure point; and transmitting the recommended remediation process to the third-party computing device.

2. The system of claim 1, wherein identifying the failure point associated with the software service comprises identifying a parameter mismatch between the software service and the target computing device, wherein the recommended remediation process comprises updating a parameter setting of the target computing device or the software service.

3. The system of claim 1, wherein the instructions, when executed by the processing device, further cause the processing device to perform the step of executing the recommended remediation process.

4. The system of claim 3, wherein executing the recommended remediation process comprising updating one or more parameters associated with the target computing device or the software service.

5. The system of claim 1, wherein the recommended remediation process comprises a code change to the software service to address the failure point.

6. A computer program product for identification of security vulnerabilities using artificial intelligence-based analysis of computing environment logs, the computer program product comprising a non-transitory computer-readable medium comprising code causing an apparatus to perform the steps of:

analyzing, using an artificial intelligence-based engine, one or more data logs associated with a software service, wherein the one or more data logs comprises a data log associated with a target computing device and a data log associated with a third-party computing device;

based on analyzing the one or more data logs, identifying a failure point associated with the software service, wherein identifying the failure point associated with the software service comprises identifying a security vulnerability associated with the software service, wherein the recommended remediation process comprises a code change to the software service to address the security vulnerability, wherein the security vulnerability is a failure to mask private data, wherein the code change to the software service comprises a code change to obfuscate the private data;

based on identifying the failure point, generating, using the artificial intelligence-based engine, a recommended remediation process for remediating the failure point; and transmitting the recommended remediation process to the third-party computing device.

7. The computer program product of claim 6, wherein identifying the failure point associated with the software service comprises identifying a parameter mismatch between the software service and the target computing device, wherein the recommended remediation process comprises updating a parameter setting of the target computing device or the software service.

8. The computer program product of claim 6, wherein the code further causes the apparatus to perform the step of executing the recommended remediation process.

9. The computer program product of claim 8, wherein executing the recommended remediation process comprising updating one or more parameters associated with the target computing device or the software service.

10. The computer program product of claim 6, wherein the recommended remediation process comprises a code change to the software service to address the failure point.

11. A computer-implemented method for identification of security vulnerabilities using artificial intelligence-based analysis of computing environment logs, the computer-implemented method comprising:

analyzing, using an artificial intelligence-based engine, one or more data logs associated with a software service, wherein the one or more data logs comprises a data log associated with a target computing device and a data log associated with a third-party computing device;

based on analyzing the one or more data logs, identifying a failure point associated with the software service, wherein identifying the failure point associated with the software service comprises identifying a security vulnerability associated with the software service, wherein the recommended remediation process comprises a code change to the software service to address the security vulnerability, wherein the security vulnerability is a failure to mask private data, wherein the code change to the software service comprises a code change to obfuscate the private data;

based on identifying the failure point, generating, using the artificial intelligence-based engine, a recommended remediation process for remediating the failure point; and transmitting the recommended remediation process to the third-party computing device.

12. The computer-implemented method of claim 11, wherein identifying the failure point associated with the software service comprises identifying a parameter mismatch between the software service and the target computing device, wherein the recommended remediation process comprises updating a parameter setting of the target computing device or the software service.

13. The computer-implemented method of claim 11, wherein the method further comprises executing the recommended remediation process.

14. The computer-implemented method of claim 13, wherein executing the recommended remediation process comprising updating one or more parameters associated with the target computing device or the software service.

15. The computer-implemented method of claim 11, wherein the recommended remediation process comprises a code change to the software service to address the failure point.

* * * * *